April 17, 1934.   C. R. LIBBY   1,955,304
CONSTANT SPEED CENTRIFUGAL CLUTCH
Filed Dec. 9, 1930

WITNESSES:

INVENTOR
Clarence R. Libby.
BY
ATTORNEY

Patented Apr. 17, 1934

1,955,304

UNITED STATES PATENT OFFICE 1,955,304

CONSTANT-SPEED CENTRIFUGAL CLUTCH

Clarence R. Libby, Springfield, Mass., assignor to Westinghouse Electric & Manufacturing Company, a corporation of Pennsylvania Application December 9, 1930, Serial No. 501,014

8 Claims. (Cl. 192—104)

My invention relates to improvements in centrifugal clutches having the centrifugal mechanism, or speed-responsive part, on the driven member, so that the driving member may be rotated at a high, variable speed, while the driven member rotates at a substantially constant speed by reason of the slippage of the clutch under the control of the centrifugal parts.

The object of my invention is to effect economies and improvements in the practical construction of such a device, giving a closer speed regulation, consistent results, a longer life, absolute safety in operation, in every way, and cool operation.

Figure 1:
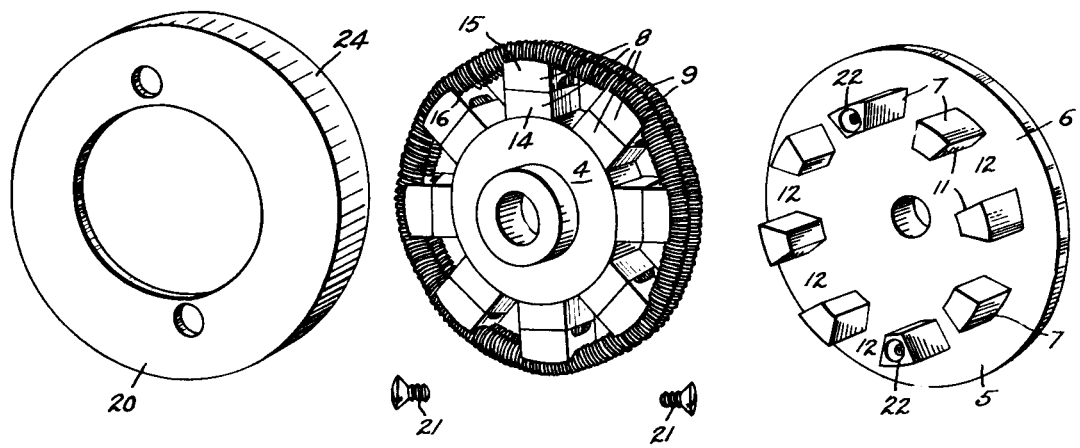
Figure 2:
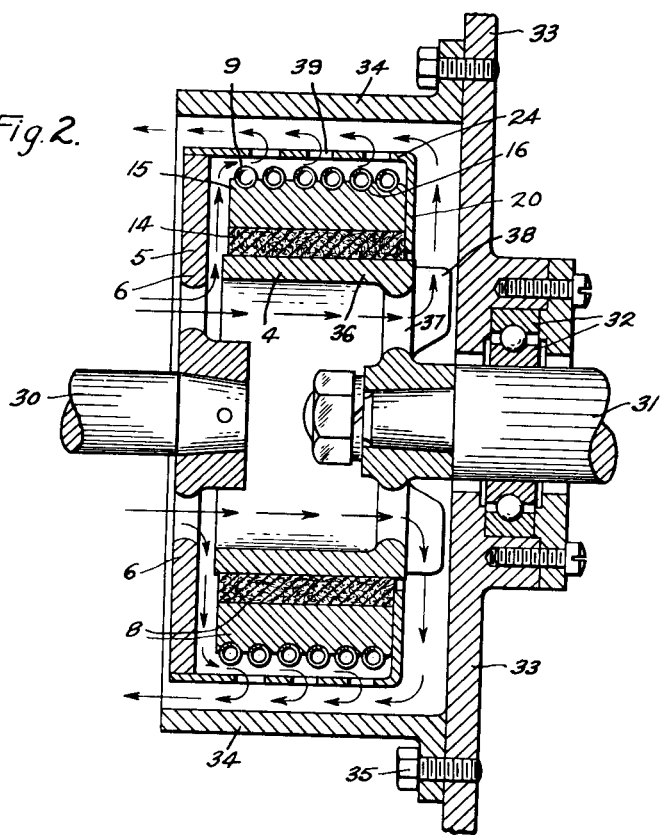

With the foregoing and other objects in view, my invention consists in the structures and combinations hereinafter described and claimed, and illustrated in the accompanying drawing wherein:

Figure 1 is an exploded perspective view showing a small clutch of my invention, and Fig. 2 is a horizontal, longitudinal sectional view through a somewhat larger centrifugal clutch embodying certain features of my invention.

My centrifugal clutch embodies, essentially, a driving drum 4 adapted to be driven at a relatively high and variable speed, and a driven cage 5 mounted coaxially with the driving drum, said cage comprising a radial portion 6 having a plurality of concentric guide-arms 7 projecting laterally therefrom and overhanging, but spaced from, the driving drum 4. Interposed between said guide-arms 7 are a plurality of frictional weight means 8 bearing against said drum and normally pressed against the drum by means of one or more garter springs 9.

The guide-arms 7 preferably have flat sides 11 defining a plurality of parallel-sided spaces 12 for radially guiding the respective frictional weight means 8. This makes the clearance of the weights in their respective slots the same, after the wearing away of the friction blocks, as when the clutch was first made. It results in a very marked improvement over standard clutches which have weights with sides cut along radial lines with respect to the center of the device, and it also makes possible the utilization of separate weight and friction elements, as will now be described.

Each of the frictional weight means 8 comprises, by preference, a friction block 14 and a separate metal weight-member 15, the latter having one or more grooves for receiving the one or more garter springs, as indicated at 16. The combined radial thickness of the friction-member 14 and weight-member 15 is such as to normally prevent the garter spring or springs 9 from contacting with the guide-arms 7 during the useful life of the clutch. It is desirable to make the guide-arms 7 sufficiently thick, in a radial direction, so that the garter springs will eventually come into contact with these guide-arms and relieve the pressure on the friction blocks before the friction blocks are worn sufficiently thin to wedge under the spacing ribs and cause the driven shaft to be locked to the driving shaft, which would result in an overspeeding of the driven shaft with sometimes disastrous consequences. If the radial pressure of the garter springs is relieved from the friction blocks before this happens, the only effect is a slowing down of the driven shaft, which is immediately noted by the user of the apparatus and is a signal that the clutch element is worn out and needs replacing.

The friction block 14 is a non-frayable block of friction material, preferably molded asbestos, made from digested or finely divided asbestos with a binder. Woven or cloth material should not be used in the composition of the friction blocks because these blocks are of necessity cut into rather small pieces for use in the friction clutch, and the cloth would fray at the edges, thereby impairing the utility of the material. Wood is not generally satisfactory as a friction material because it is not sufficiently uniform for quantity production and it does not in general have a sufficiently high coefficient of friction. The material used for the friction block may be fibrous, if the fibers are disposed radially and if the coefficient of friction is sufficiently high, the radial disposition of fibers (as in a wooden block) being desirable in order to prevent the fibers from splitting off as they wear down, every precaution being taken to avoid this fraying or splitting off of the friction material. The material should also be one which is relatively unaffected by temperature changes, for example, one which drops from a coefficient of friction of 0.35 to 0.30 when the temperature changes from 80° to 180° F.

The friction material must have a high coefficient of friction, say above 0.3, or approximately 0.36, particularly in devices operating at speeds of the order of 2000 R. P. M. or higher. I have found that the success of my friction-clutch design is very largely dependent upon the use of a friction material having a high coefficient of friction, with the iron or metal drum 4. If a coefficient of friction below about 0.3 were utilized, the drum would have to be of larger diameter in order to secure a sufficient area, the springs would have to be much more strongly stressed in order to press the friction blocks against the drum with sufficient force, and the weights would have to be heavier in order to overcome the spring pressure at the critical speed. If the springs were overstressed, inconsistent results would result. The use of material with a high coefficient of friction enables the designer to keep down the size, both in the springs and in the weights, and thus makes for a much more economical design. It is my belief that a failure to appreciate this one phase of centrifugal-clutch design has contributed more than any one cause to the commercial unimportance of this type of clutch heretofore.

The friction blocks 14 are preferably made from sheet material which is cut to the proper size, and, as before stated, that sheet material is preferably molded asbestos. A large number of small blocks distributed on all sides of the circumference of the driving drum 4 is preferred to a small number of larger ones, which would be more likely to tilt the weight, preventing smooth operation. The garter spring or springs 9 should preferably, also, be approximately circular. In general, at least four friction blocks should be utilized. In the form of my invention illustrated in Fig. 1, eight friction blocks are used.

In general, it will be found that a much more economical design is obtained by utilizing a separate weight-block 15 in addition to the friction block 14, so as to economize in space. The weight-block may be made from pressed steel for low-speed clutches, or from cast aluminum for high-speed clutches, and the spring-receiving grooves 16 may be cast or rolled therein without requiring a separate manufacturing operation.

An important improvement which I have incorporated in my centrifugal clutch consists of a case, or cover or guard, in the form of a cylindrical cap 20, which is carried by the driven cage member, being secured thereto by screws 21 extending into tapped poles 22 in two of the guide-arms 7 of the cage 5. This guard has a cylindrical portion 24 which is spaced only slightly from the garter springs at standstill, the spacing being perhaps 1/64 inch for the smaller clutches, ranging up to perhaps 1/32 inch for the larger clutches of about 4 inches diameter. In general, the spacing is as close as is consistent with convenient manufacturing operations. It will be noted that the case or guard is carried by the same member which carries the springs, and hence there is no relative movement, ever, between the springs and the guard, so that there is no danger of weakening the springs by rubbing against their coils. The guard keeps some of the weights from flying out too far on one side and pulling other weights in closer on the other side. It overcomes any difficulty due to inevitable manufacturing variation in the springs, particularly in a multiple-spring clutch, and it makes for surer operation and closer speed regulation, besides safeguarding the parts from flying apart under excessive speed conditions, as where the clutch is erroneously assembled, with the drum 4 on the driven shaft and the cage 5 on the high-speed driving shaft (not shown in Fig. 1).

In Fig. 2, I have shown my invention applied to a larger clutch, utilizing six springs 9 instead of the two springs utilized in the device shown in Fig. 1. In this figure, the driven shaft is shown at 30, carrying the cage member 5, and the driving shaft is shown at 31, carrying the drum 4. One of the bearings for the driving shaft is indicated in Fig. 2, the same being a ball bearing 32 which is supported by a stationary support or frame 33, the latter having a tubular stationary guard 34 bolted thereto or otherwise united therewith as indicated at 35, for enclosing the entire clutch structure. This stationary guard 34 belongs to a motor-clutch unit which is described and claimed in an application of E. H. Knight, Serial No. 514,184, filed February 7, 1931, Patent No. 1,924,322 patented August 29, 1933, and assigned to the Westinghouse Electric and Manufacturing Company.

The clutch which is shown in Fig. 2 is a ventilated clutch consisting of a hollow drum 4 having a thin tube or cylinder 36 for the drum part, supported, at the end farthest from the radial cage-portion 6, on a radial drum-supporting element 37. The radial cage-portion 6 and the radial drum-supporting element 37 are both provided with a plurality of ventilating openings, whereby a blast of cooling air is circulated over the inner surface of the drum-cylinder 36, which is the hottest part of the clutch. This circulation of air may be increased by radial fan blades 38 on one of the members, preferably on the high-speed member 37, as shown, so that the ventilating effect will vary with the speed of the high-speed member, being the greatest when the speed of the driving member is the greatest and hence when the friction-loss by slippage is the greatest.

In the particular clutch shown in Fig. 2, the garter springs 9 are also ventilated by means of a plurality of holes 39 cut in the cylindrical portion 24 of the guard 20 which is carried by the constant-speed driven cage 5.

The use of ventilation increases the load rating of a given size of clutch and produces a much better performance thereof. The lives and effectiveness of both the springs and the friction material are enhanced by keeping down their temperatures, and the reliability of their operation is much improved.

I claim as my invention:

1. A centrifugal clutch comprising a relatively high-speed driving drum, a co-axial relatively low-speed driven cage comprising a radial portion and a plurality of concentric guide-arms projecting laterally therefrom and overhanging, but spaced from, the driving drum, a plurality of centrifugally operated frictional weight means interposed between said guide-arms and bearing against said drum, one or more garter springs encircling said frictional weight means and pressing the same against said drum, and a guard carried by said cage and comprising a cylindrical portion spaced only slightly from the garter springs at standstill, whereby said guard serves not only as a protecting means but also as a means for preventing an unbalancing of the centrifugally operated weight means.

2. A centrifugal clutch comprising a relatively high-speed driving drum, a co-axial relatively low-speed driven member comprising a radial portion, a plurality of concentric guide-means projecting laterally from said radial portion and overhanging, but spaced from, the driving drum, a plurality of centrifugally operated frictional weight means supported, with some freedom of radial movement, by said guide-means and bearing on said drum on substantially all sides of its circumference, said member further comprising, in its make-up, spring means restraining the centrifugal movement of said centrifugal weight means in such manner that an outward movement of one weight means causes an increased inwardly directed spring tension on another weight means, and a guard carried by the low-speed member and comprising a cylindrical portion so closely spaced as to substantially prevent any portion of said friction, weight, spring combination from moving far away from said drum.

3. A centrifugal clutch comprising a relatively high-speed driving drum, a co-axial relatively low-speed driven cage comprising a radial portion and a plurality of concentric guide-arms projecting laterally therefrom and overhanging, but spaced from, the driving drum, a plurality of frictional weight means interposed between said guide-arms and bearing against said drum, and one or more garter springs encircling said frictional weight means and pressing the same against said drum, said guide-arms having flat side faces defining a plurality of parallel-sided spaces for radially guiding said frictional weight means, each of said frictional weight means comprising a molded asbestos block and a metal weight-member, both guided in one of said parallel-sided spaces between two of the guide-arms, and having a combined radial thickness normally to prevent the garter spring or springs from contacting with the guide-arms during the useful life of the clutch.

4. A centrifugal clutch comprising a relatively high-speed driving drum, a co-axial relatively low-speed driven member comprising frictional weight means bearing on said drum on substantially all sides of its circumference, said member further comprising, in its make-up, spring means restraining the centrifugal movement of said centrifugal weight means and a guard carried by the low-speed member and comprising means for substantially preventing any portion of said frictional weight, spring combination from moving far away from said drum, characterized by said driving drum consisting of a hollow metal cylinder and means for drawing air over the inner surface thereof.

5. A centrifugal clutch comprising a relatively high-speed driving drum, a co-axial relatively low-speed driven member comprising frictional weight means bearing on said drum on substantially all sides of its circumference, said member further comprising, in its make-up, spring means restraining the centrifugal movement of said centrifugal weight means, and a guard carried by the low-speed member and comprising a perforated cylindrical portion for substantially preventing any portion of said friction, weight, spring combination from moving far away from said drum and for permitting an outward blast of ventilating air.

6. A centrifugal clutch comprising a relatively high-speed driving drum, a co-axial relatively low-speed driven cage comprising a radial portion and a plurality of concentric guide-arms projecting laterally therefrom and overhanging, but spaced from, the driving drum, a plurality of frictional weight means interposed between said guide-arms and bearing against said drum, and one or more garter springs encircling said frictional weight means and pressing the same against said drum, said radial cage-portion having ventilating openings, said drum consisting of a hollow metal cylinder supported, at the end remote from said radial cage-portion, by a radial drum-supporting portion also having perforations.

7. A centrifugal clutch comprising a relatively high-speed driving drum, a co-axial relatively low-speed driven cage comprising a radial portion and a plurality of concentric guide-arms projecting laterally therefrom and overhanging, but spaced from, the driving drum, a plurality of frictional weight means interposed between said guide-arms and bearing against said drum, and one or more garter springs encircling said frictional weight means and pressing the same against said drum, said radial cage-portion having ventilating openings, said drum consisting of a hollow metal cylinder supported, at the end remote from said radial cage-portion, by a radial drum-supporting portion also having perforations, and fan blades carried by said radial drum-supporting portion.

8. A centrifugal clutch comprising a relatively high-speed driving drum, a co-axial relatively low-speed driven cage comprising a radial portion and a plurality of concentric guide-arms projecting laterally therefrom and overhanging, but spaced from, the driving drum, a plurality of frictional weight means interposed between said guide-arms and bearing against said drum, and one or more garter springs encircling said frictional weight means and pressing the same against said drum, said guide-arms having flat side faces defining a plurality of parallel-sided spaces for radially guiding said frictional weight means, each of said frictional weight means comprising a friction block and a metal weight-member, both guided in one of said parallel-sided spaces between two of the guide-arms, said metal weight-members having a radial thickness such that at the end of the useful life of the clutch the garter spring or springs will rest on the projecting guide-arms before the friction blocks have been reduced to a radial thickness equal to the space between the guide-arms and the driving drum.

CLARENCE R. LIBBY.